(12) United States Patent
Pfister et al.

(10) Patent No.: US 7,172,645 B1
(45) Date of Patent: Feb. 6, 2007

(54) GAS FILTRATION AND STORAGE USING ACTIVATED CARBON/GRAPHITE FOAM MONOLITHS

(75) Inventors: Dennis M. Pfister, San Luis Obispo, CA (US); Charles M. Byrd, Rensselaer, NY (US)

(73) Assignee: Sun Microsystems, Inc., Santa Clara, CA (US)

( * ) Notice: Subject to any disclaimer, the term of this patent is extended or adjusted under 35 U.S.C. 154(b) by 184 days.

(21) Appl. No.: 10/611,496

(22) Filed: Jun. 30, 2003

(51) Int. Cl.
*B01D 53/04* (2006.01)

(52) U.S. Cl. .................. 95/116; 95/128; 95/138; 95/139; 95/148; 96/128; 96/137; 96/143; 96/154

(58) Field of Classification Search .................. 95/106, 95/114–116, 128, 138, 139, 148; 96/126–128, 96/130, 133, 143, 146, 154
See application file for complete search history.

(56) References Cited

U.S. PATENT DOCUMENTS

| | | | | |
|---|---|---|---|---|
| 4,737,164 | A * | 4/1988 | Sarkkinen ...................... 95/68 |
| 4,790,859 | A * | 12/1988 | Marumo et al. ............... 95/138 |
| 5,110,328 | A * | 5/1992 | Yokota et al. ................. 96/112 |
| 5,750,026 | A * | 5/1998 | Gadkaree et al. ........ 210/502.1 |
| 5,902,562 | A * | 5/1999 | Lagasse et al. .......... 423/445 R |
| 5,914,294 | A * | 6/1999 | Park et al. .................... 502/417 |
| 5,925,168 | A * | 7/1999 | Judkins et al. ................. 95/27 |
| 5,961,814 | A * | 10/1999 | Kearns .......................... 208/39 |
| 5,972,077 | A | 10/1999 | Judkins et al. |
| 6,033,506 | A * | 3/2000 | Klett ............................. 156/78 |
| 6,503,298 | B1 * | 1/2003 | Monzyk et al. ................ 95/96 |
| 6,508,862 | B1 * | 1/2003 | Tonkovich et al. ............ 95/106 |
| 6,656,443 | B2 | 12/2003 | Klett ....................... 423/445 R |
| 6,708,546 | B2 * | 3/2004 | Myasnikov et al. .......... 72/121 |
| 6,709,497 | B2 * | 3/2004 | Myasnikov et al. .......... 96/126 |
| 2001/0027723 | A1 * | 10/2001 | Jain et al. ....................... 95/96 |
| 2002/0020292 | A1 * | 2/2002 | Wojtowicz et al. ........... 95/116 |
| 2003/0145726 | A1 * | 8/2003 | Gueret et al. .................. 95/96 |
| 2003/0232897 | A1 * | 12/2003 | Pfister et al. ................ 521/142 |
| 2004/0045438 | A1 * | 3/2004 | Place et al. .................... 95/141 |

OTHER PUBLICATIONS

"High Thermal Conductivity, Mesophase Pitch-Derived Carbon Foam", James Klett, Proceedings of the 1998 43rd Int'l SAMPE Symposium and Exhibition, part 1 of 2, Anaheim, CA, 43:1, pp. 745-755 (May 31- Jun. 4, 1998).

* cited by examiner

*Primary Examiner*—Duane Smith
*Assistant Examiner*—Ives Wu October
(74) *Attorney, Agent, or Firm*—Gunnison, McKay & Hodgson, L.L.P.; Philip J. McKay (57) ABSTRACT

An apparatus for separating a first gas from a mixture of the first gas and at least one second gas comprises a housing having an inlet port and an outlet port and an adsorbent which is positioned in the housing. The adsorbent comprising a carbon based foam monolith that has an affinity for the first gas. Thus, as the gas mixture flows through the housing, the first gas will be adsorbed onto the adsorbent and the second gas will exit the housing through the outlet port. In this manner, the first gas is separated from the second gas.

37 Claims, 3 Drawing Sheets

GAS FILTRATION AND STORAGE USING ACTIVATED CARBON/GRAPHITE FOAM MONOLITHS

BACKGROUND OF THE INVENTION

The present invention relates to an apparatus for separating a target gas from a mixture of at least two gases. More particularly, the invention relates to such an apparatus which employs an activated carbon or graphitic foam monolith to adsorb the target gas from the mixture of gases and thereby separate the target gas from the mixture.

Gas filtration or separation devices are used to separate a target gas from a gas stream containing a mixture of gases. These devices commonly employ an adsorbent material, such as zeolite or activated carbon, to adsorb the target gas from the gas stream. Once the adsorbent becomes saturated with the target gas, the target gas is desorbed from the adsorbent using, for example, thermal or electrical energy and discharged into a storage container. The quantity of target gas that can be separated by the device depends on the amount of adsorbent used and the number of adsorption and desorption cycles the adsorbent undergoes.

The rate at which the target gas may be adsorbed onto the adsorbent is directly related to the temperature of the adsorbent. Thus, the lower the temperature of the adsorbent, the quicker the target gas will be adsorbed. However, as the target gas is adsorbed onto the adsorbent, a substantial amount of heat is generated which can raise the temperature of the adsorbent and its supporting structure by a significant degree. In addition, when heat is used to desorb the target gas from the adsorbent, this heat can substantially raise the temperature of the adsorbent and its supporting structure. Therefore, the heats of adsorption and desorption must be dissipated from the adsorbent both prior to and during each adsorption cycle.

Thus, the ability of prior art gas separation devices to execute repeated adsorption and desorption cycles depends in large part on the thermal conductivity of the adsorbent. When the thermal conductivity of the adsorbent is limited, sufficient time must be allowed both prior to and during the adsorption cycle to permit the heats of adsorption and desorption to be dissipated from the adsorbent. This in turn usually requires the use of a large amount of adsorbent in order to separate an acceptable amount of target gas during each adsorption cycle. Moreover, although the cycle times can be decreased somewhat by the use of ancillary heat removal devices, such as cooling tubes and fins, these devices increase the expense and complexity of the apparatus.

SUMMARY OF THE INVENTION

In accordance with the present invention, these and other limitations in the prior art are overcome by providing an apparatus for separating a first gas from a mixture of the first gas and at least one second gas. The apparatus includes a housing which comprises an inlet port and an outlet port, an adsorbent which is positioned in the housing and which comprises a carbon based foam monolith that has an affinity for the first gas, and a device for desorbing the first gas from the adsorbent. During a first phase of operation of the apparatus, the first gas is adsorbed onto the adsorbent to separate the first gas from the second gas. During a second phase of operation of the apparatus, the first gas is desorbed from the adsorbent and expelled through the outlet port.

In accordance with one embodiment of the invention, the adsorbent comprises a mesophase pitch-based graphitic foam product. In accordance with another embodiment of the invention, the adsorbent comprises a mesophase pitch-based activated graphitic foam product. Thus, the adsorbent will ideally comprise a thermal conductivity of at least 100 W/m-K. More preferably, the adsorbent will comprise a thermal conductivity of at least about 150 W/m-K.

In accordance with a further embodiment of the invention, the desorbing means comprises a first electrical conductor which is positioned against a first surface of the adsorbent, a second electrical conductor which is positioned against a second surface of the adsorbent, and a power supply which is connected across the first and second conductors. Upon activation of the power supply, an electrical current is conducted across the adsorbent to desorb the first gas from the adsorbent in a desorption reaction. Furthermore, in accordance with an optional aspect of the invention, the desorption reaction is substantially non-thermal.

Thus, the apparatus of the present invention provides an effective means for separating the first gas from the second gas. In addition, since the adsorbent preferably comprises a carbon based foam monolith having a relatively high thermal conductivity, any heat which is generated during the adsorption of the first gas will be readily dissipated from the adsorbent. Furthermore, if as in one embodiment of the invention the desorption reaction is substantially non-thermal, the adsorbent will not be heated substantially during the desorption reaction. Therefore, a relatively small amount of adsorbent may be used and cycled frequently between the adsorption and desorption reactions to desorb a large quantity of the first gas.

These and other objects and advantages of the present invention will be made apparent from the following detailed description, with reference to the accompanying drawings. In the drawings, the same reference numbers are used to denote similar elements in the various embodiments.

DETAILED DESCRIPTION OF THE PREFERRED EMBODIMENTS

The gas filtration and storage apparatus of the present invention is designed to separate a target gas from a mixture of at least two gases and then preferably store the target gas or the remaining gases for future use. The apparatus employs a chemical adsorbent to attract and bind the target gas and thereby separate the target gas from the remaining gases in the mixture. The target gas may be stored on the adsorbent or subsequently desorbed from the adsorbent and stored in a suitable container. In order to facilitate the removal of the heats of adsorption and desorption from the adsorbent, the adsorbent is preferably constructed of an activated carbon or graphite foam monolith having a relatively high thermal conductivity. Therefore, as the mixture of gases is flowed over and through the adsorbent, the heats of adsorption and desorption will be readily conducted through the adsorbent and dissipated by the flow of the remaining gases in the mixture. As a result, a relatively small amount of adsorbent can be cycled frequently to remove a comparatively large amount of target gas from the mixture of gases.

Figure 1:
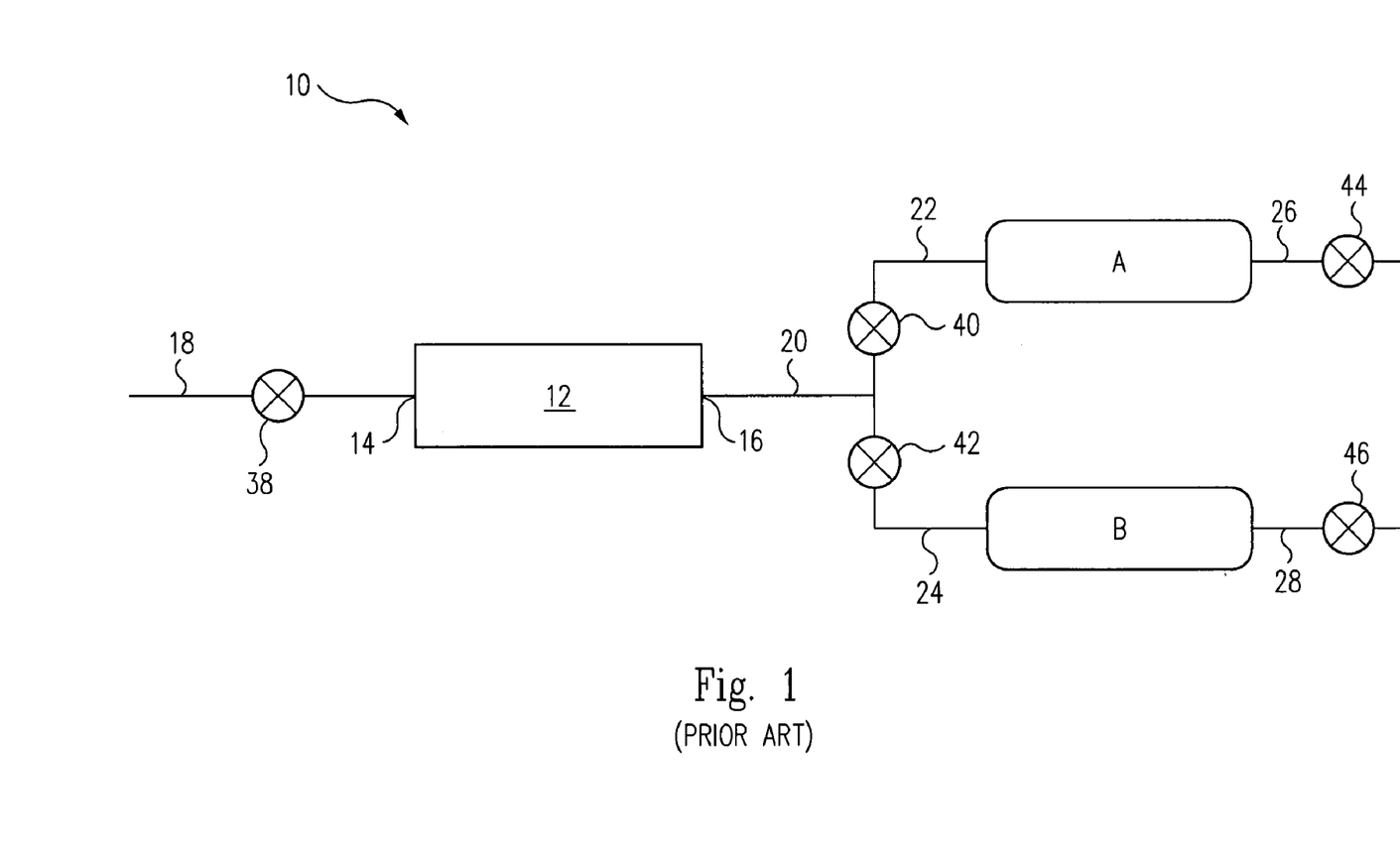
FIG. 1 is a schematic representation of the gas filtration and storage apparatus of the present invention.

Referring to FIG. 1, the gas filtration and storage apparatus of the present invention, which is indicated generally by reference number 10, is shown to comprise a separator 12 which includes an inlet port 14 and an outlet port 16, an inflow conduit 18 which is connected to the inlet port 14, and an outflow conduit 20 which is connected to the outlet port 16. In addition, the apparatus 10 may include an optional first gas storage container A, which is connected to the outflow conduit 20 by a first branch conduit 22, and an optional second gas storage container B, which is connected to the outflow conduit 20 by a second branch conduit 24. The apparatus 10 may also include a third branch conduit 26 to connect the first gas storage container A to additional process piping (not shown), and a fourth branch conduit 28 to connect the second gas storage container B to the process piping.

Figure 2:
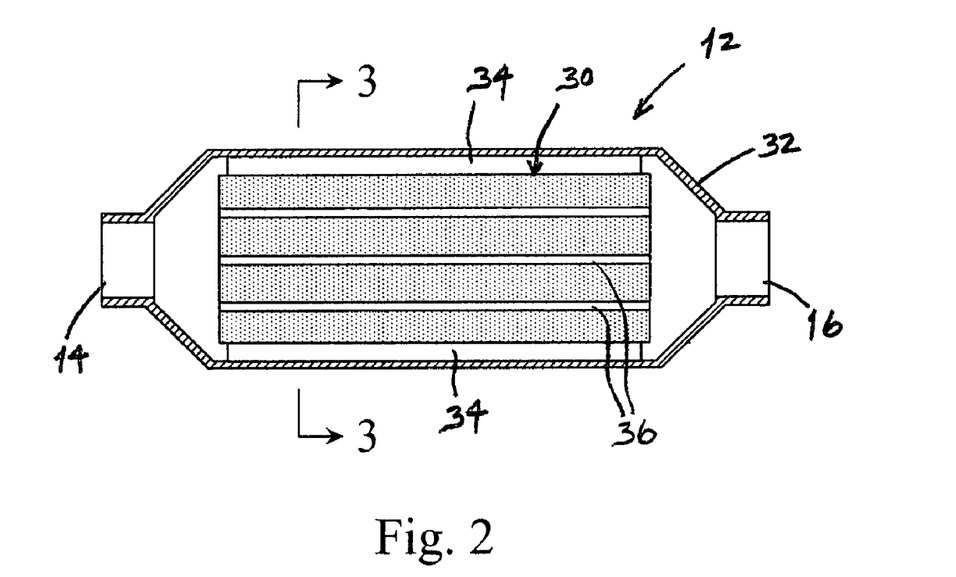
FIG. 2 is a cross sectional view of the separator component of the apparatus of FIG. 1.
Figure 3:
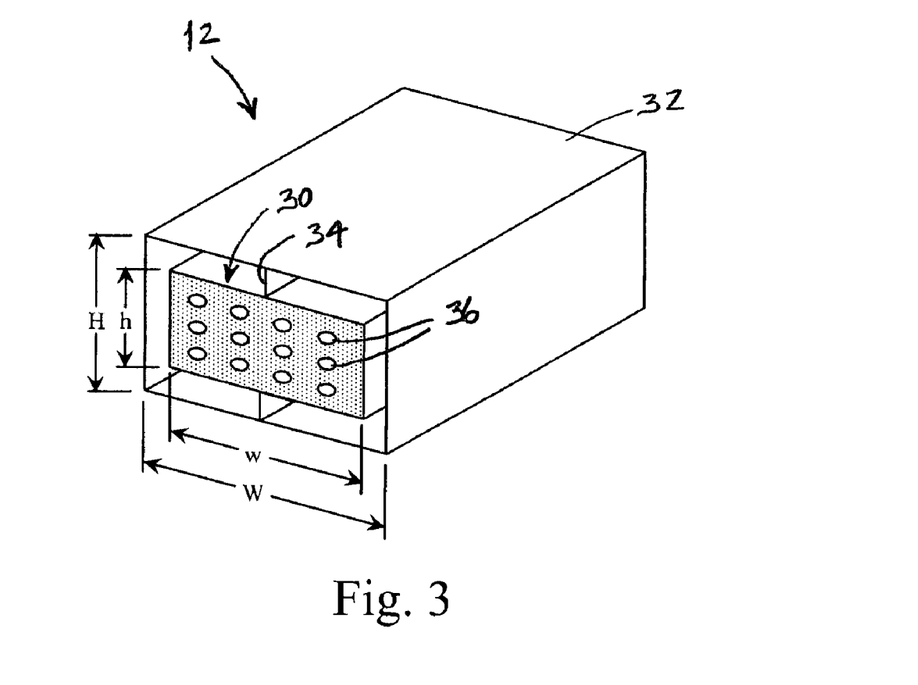
FIG. 3 is a partial perspective view of the separator component of FIG. 2 taken along the line 3-3.

Referring to FIGS. 2 and 3, an exemplary embodiment of the separator 12 comprises a chemical adsorbent 30 that is positioned in a support structure or housing 32 in which the inlet and outlet ports 14,16 are formed. The adsorbent 30 is preferably a solid monolith which ideally has at least one cross-sectional dimension that is smaller than the corresponding cross sectional dimension of the housing 32. This will allow the gas to flow freely around at least a portion of the outer surface of the adsorbent 30. For example, as shown most clearly in FIG. 3, the adsorbent 30 may have a width w and a height h that are smaller than the width W and the height H of the housing 32, respectively. When constructed in this manner, the separator 12 preferably also includes a number of fins 34 or similar members to support the adsorbent 30 within the housing 32. The fins 34 are ideally aligned with the inlet and outlet ports 14, 16 so as not to impede the flow of gas through the separator 12. Furthermore, the adsorbent 30 may include a number of axial gas flow passages 36 extending therethrough to facilitate the flow of gas through the adsorbent. Although the separator 12 is shown as having a rectangular cross section, it could have any practical cross section, including square, circular or elliptical.

The adsorbent 30 ideally comprises both a good affinity for the target gas of interest and a relatively high thermal conductivity. As a result, the target gas will be readily adsorbed onto, and the heat of adsorption will be quickly dissipated from, the adsorbent 30 as the gas stream passes through the separator 12. In one embodiment of the invention, the adsorbent 30 comprises a carbon based foam monolith, such as an activated carbon or graphite foam monolith. Such materials have a high affinity for, and can therefore be used to separate, a number of gases, including oxygen, hydrogen, ammonia and carbon dioxide. In addition, carbon and graphite foams generally exhibit superior heat transfer characteristics due to their relatively high thermal conductivities. Consequently, any heat which is generated in the adsorbent 30 during operation of the apparatus 10 will be readily dissipated by the gas stream, as will be described more fully below. In a preferred embodiment of the invention, the adsorbent 30 is a carbon based foam monolith having a thermal conductivity of at least about 100 W/m-K. More preferably, the adsorbent is an activated carbon based foam monolith having a thermal conductivity of at least about 150 W/m-K.

In accordance with one embodiment of the invention, the adsorbent 30 ideally comprises a solid mesophase pitch-based graphitic foam product, such as is described in U.S. Pat. No. 5,961,814 and U.S. Pat. No. 6,033,506, which are hereby incorporated herein by reference. Another graphitic foam product which is suitable for use in the present invention is available from Poco Graphite, Inc. of Decatur, Tex, under the brand name PocoFoam™. Due to their open microcellular structure and interconnected network of highly aligned graphitic ligaments, such graphitic foam products have relatively low densities yet comparatively high thermal conductivities. For example, the PocoFoam™ graphitic foam product comprises a density of less than about 0.6 $g/cm^3$ but a thermal conductivity of around 150 W/m-K. Consequently, these mesophase pitch-based graphitic foam products are comparatively lightweight but have superior heat transfer characteristics. In addition, owing to their open microcellular structure, such foam products comprise a large specific surface area. The PocoFoam™ graphitic foam product, for example, comprises a specific surface area of greater than about 4 $m^2/g$.

The specific surface area of the adsorbent 30 may be increased by activating the carbon or graphite foam using a suitable activation technique. However, since conventional activation techniques often degrade the mechanical properties of graphitic foam products, an acceptable alternative would include using a foam product which is activated prior to being graphitized. Such a graphitic foam product is described in applicants' co-pending U.S. patent application Ser. No. 10/174,838, which is hereby incorporated herein by reference.

In operation of the apparatus 10, a stream of gas containing a mixture of the target gas and at least one second gas is communicated to the separator 12 through the inflow conduit 18. As the gas stream passes through the separator 12, the target gas is adsorbed onto the adsorbent 30. The second gas, not having an affinity for the adsorbent 30, will simply pass over and through the adsorbent and exit the separator 12 through the outlet port 16. The second gas may then either be communicated to the first storage container A through the outflow conduit 20 and the first branch conduit 22, or expelled into the process piping through the outflow conduit, the first branch conduit and the third branch conduit 26. Thus, the second gas may either be stored in the first storage container A, if the apparatus 10 comprises such a container, or expelled into the process piping.

During this phase of operation of the apparatus 10, a significant amount of heat of adsorption will be generated in the separator 12 as the target gas is adsorbed onto the adsorbent 30. However, since the carbon or graphitic foam adsorbent 30 is highly thermally conductive, the heat of adsorption will be conducted through the adsorbent relatively quickly. Moreover, as the gas stream passes over and through the adsorbent 30, the second gas will readily remove the heat of adsorption from the adsorbent. Consequently, the adsorbent 30 will remain relatively cool and the adsorption of the target gas onto the adsorbent will not be significantly impeded by the heat of adsorption.

In accordance with one aspect of the present invention, the target gas may either be stored in the separator 12 on the adsorbent 30 or desorbed from the adsorbent 30 and communicated to one or both of the first and second storage containers A and B. The target gas may be desorbed from the adsorbent 30 using any conventional desorption mechanism, such as a pressure swing technique, a temperature swing technique or an electrical swing technique. Examples of the latter two techniques are provided below. As the target gas is desorbed from the adsorbent 30, it is communicated through the outflow conduit 20 and into either or both of the first and second storage containers A and B via the corresponding first and second branch conduits 22,24.

An important feature of the present invention is the ability to filter or separate large quantities of the target gas using a relatively small amount of adsorbent 30. This may be accomplished by periodically stopping the flow of gas into the separator 12 and desorbing the target gas from the adsorbent 30. In this manner, the adsorbent 30 may be regularly refreshed during the gas separation process. Moreover, due to the high thermal conductivity of the adsorbent 30, the heat of adsorption will be readily removed from the adsorbent by the flow of gas through the separator 12. Furthermore, even if heat is used as the desorption mechanism, the heat of desorption will be quickly dissipated by the subsequent flow of gas through the separator 12. Therefore, little or no time will be required after each desorption reaction to allow the adsorbent 30 to cool. Thus, the adsorbent 30 can be refreshed relatively frequently without interfering appreciably with the flow of gas through the separator 12. As a result, a relatively small amount of adsorbent 30 can be used and cycled frequently between the adsorption and desorption reactions to separate an unlimited quantity of the target gas from the gas stream.

Referring again to FIG. 1, the apparatus 10 may also include a number of valves or similar means to control the flow of gas through the apparatus. For example, an inlet valve 38 may be connected to the inflow conduit 18 to control the flow of gas into the separator 12. Also, a first outlet valve 40 may be connected between the outflow conduit 20 and the first storage tank A to control the flow of gas between these components. Similarly, a second outlet valve 42 may be provided between the outflow conduit 20 and the second storage tank B to control the flow of gas between these components. In addition, the apparatus 10 may comprise a pair of discharge valves 44 and 46 in the third and fourth branch conduits 26 and 28, respectively, to control the flow of gas from these conduits into the process piping.

Each of the valves 38, 40, 42, 44 and 46 may be any conventional valve which is suitable for its intended purpose. For example, each of the valves 38, 40, 42, 44 and 46 may be an appropriate manually, hydraulically or electrically actuatable valve. In addition, the valve 38 may be a check valve which is oriented so as to prevent the flow of gas from the separator 12 back into the inflow conduit 18. Also, the valves 40 and 42 may be replaced by a single three-way valve which may be operated to selectively connect the outflow conduit 20 with the second branch conduit 22 or the third branch conduit 24. Furthermore, in the event the apparatus 10 does not include the second storage tank B and the second and fourth branch conduits 24 and 28, the valve 40 may be replaced by a check valve which is oriented to prevent the flow of gas back into the separator 12.

Figure 4:
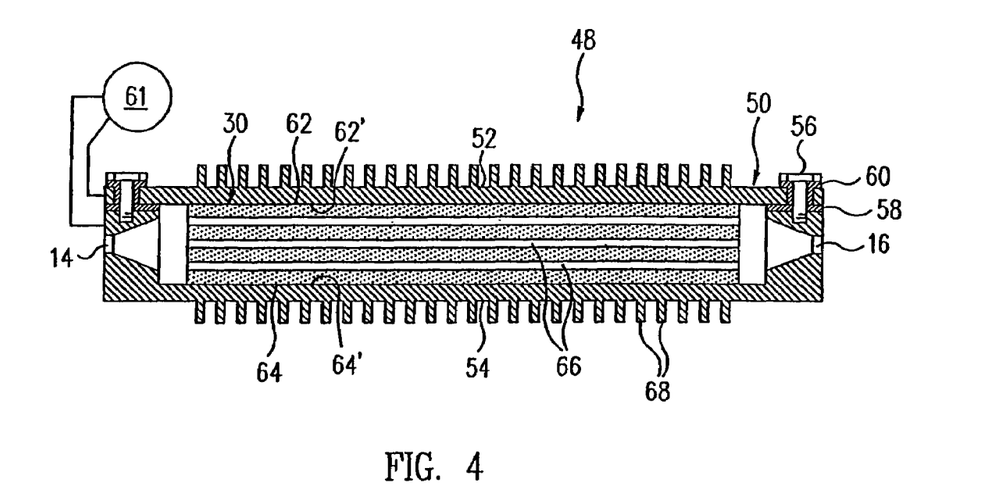
FIG. 4 is an alternative embodiment of the separator component for the apparatus of FIG. 1.

Referring now to FIG. 4, another embodiment of a is shown which is particularly useful when electrical energy is employed to desorb the target gas from the adsorbent 30. The separator of this embodiment, which is indicated generally by reference number 48, comprises a support structure or housing 50, an adsorbent 30 which is positioned within the housing, an inlet port 14 and an outlet port 16. The housing 50 includes a top plate 52 which is attached to a bottom plate 54 by suitable means, such as a number of bolts 56. In this example, the top plate 52 comprises a first electrical conductor and the bottom plate 54 comprises a second electrical conductor. Accordingly, the top and bottom plates 52, 54 are made of a suitable electrically conductive material, such as an aluminum alloy. In addition, the top and bottom plates 52, 54 are electrically insulated from each other, such as by a suitable gasket 58 or a nonconductive coating which is formed on the adjoining surfaces of the top and bottom plates. Furthermore, in the event the top and bottom plates 52, 54 are secured together by bolts 56, an insulating grommet 60 is ideally positioned between each bolt and the top plate to electrically isolate the bolt, and thus the bottom plate, from the top plate.

In an exemplary embodiment of the invention, the adsorbent 30 may comprise a generally flat top surface 62, a generally flat bottom surface 64 and a height h extending between the top and bottom surfaces. The top and bottom surfaces 62, 64 may have any practical configuration, such as rectangular, square or circular. In addition, the adsorbent 30 may include a number of gas flow passages 66 extending therethrough. The passages 66 are ideally aligned with the inlet and outlet ports 14, 16 to facilitate the flow of gas through the separator 48.

In operation of the separator 48, a preferably DC current from a power supply 61 is conducted through the top and bottom plates 52, 54 and across the adsorbent 30. The electrical current liberates the molecules of the target gas from the adsorbent 30, and the resulting high energy target gas expands through the outlet port 16 and into the outflow conduit 20. During this reaction, the valve 38 prevents the target gas from expanding back into the inflow conduit 18.

The exact mechanism by which the electrical current effects the desorption of the target gas from the adsorbent 30 is not known. However, the inventors believe that, when the current is conducted through the adsorbent 30, electrons are channeled into the bond between each target gas molecule and its associated adsorbent molecule until the bond is broken and the target gas molecule is liberated from the adsorbent molecule. With respect to the carbon based adsorbents in particular, one theory is that the electrons from the power supply 61 displace the electrons of the target gas molecule in the conduction band of the adsorbent molecule, thereby freeing the target gas molecule from the adsorbent molecule. Another theory is that the electrons impart sufficient energy to the target gas molecule to allow it to escape the electrical potential binding it to its associated adsorbent molecule.

In accordance with one embodiment of the present invention, when the apparatus 10 is used to separate certain target gases, such as ammonia, neither the target gas nor the carbon or graphitic foam adsorbent 30 are heated appreciably by the electrical current during the desorption reaction. Thus, the desorption reaction is substantially non-thermal. As used herein, "non-thermal desorption" refers to a mechanism of desorption that does not rely on thermal energy to stochastically heat the adsorbent 30 to the degree sufficient to break the bonds between the target gas and the adsorbent molecules. Thus, while some isolated, localized heating of the adsorbent 30 may occur during the desorption reaction, the temperature of the adsorbent should remain statistically below the threshold temperature for thermal desorption to take place.

One method for determining whether a particular desorption reaction is either thermal or substantially non-thermal is to measure the bulk temperature of the adsorbent 30 during the desorption reaction. If the bulk temperature is greater than the known temperature which is required to effect a thermal or heat-activated desorption, then the reaction is thermal. However, if the bulk temperature of the adsorbent 30 during the desorption reaction is less than the temperature required to effect the thermal desorption, the reaction may or may not be thermal.

In this event, the velocity distribution of the desorbed target gas molecules may be analyzed to determine whether the desorption reaction is substantially non-thermal. The molecular velocity distribution can be determined by, for example, using time-of-flight spectroscopy to produce a time-resolved distribution of the florescence intensities of a characteristic molecular beam. Then, using a Fourier transform, the molecular velocity distribution can be extracted from the florescence data. Since it is known that in a non-thermal process the velocity distribution of the desorbed target gas molecules should be primarily non-Maxwellian, by analyzing the time-of-flight spectroscopy data, the thermal/non-thermal nature of the desorption process can be determined.

Referring still to FIG. 4, the housing 50 of the separator 48 may be designed to help dissipate the heat of adsorption from the adsorbent 30. Thus, in addition to being electrically conductive, the top and bottom plates 52, 54 are preferably constructed of a material having a good thermal conductivity. In addition, if the adsorbent 30 comprises relatively large top and bottom surfaces 62, 64 compared to its height h, the top and bottom plates 52, 54 ideally each include a respective inner surface 62', 64' which engages substantially the entire corresponding top or bottom surface of the adsorbent. In this manner, the thermal diffusion path length for the adsorbent 30 will be minimized (in effect one-half the height h), and the rate of heat transfer from the adsorbent will consequently be maximized. In addition, the top plate 52 or the bottom plate 54, or both, may be provided with cooling fins 68 to assist in the dissipation of the heat of adsorption from the adsorbent 30.

Furthermore, the transfer of thermal and electrical energy through the junction between the adsorbent 30 and the housing 50 is preferably optimized by enhancing the contact between the adsorbent and the top and bottom plates 52, 54. This may be accomplished by soldering or brazing the adsorbent 30 to the top and/or bottom plates 52, 54. Alternatively, the adsorbent 30 may be affixed to the top and/or bottom plates 52, 54 using a suitable thermally and electrically conductive adhesive. Where brazing, soldering or gluing are not appropriate, the adsorbent 30 and the housing 50 may be designed with a slight interference fit to produce a suitable contact pressure between the adsorbent and the top and bottom plates 52, 54. The contact between the adsorbent 30 and the housing 50 may also be enhanced by positioning a foil of soft metal, such as indium, between the adsorbent and each of the top and bottom plates 52, 54.

A particular advantage of the separator 48 is the ability to desorb less than the entire amount of target gas from the adsorbent 30. When an electrical current is used to desorb the target gas from the adsorbent 30 in a substantially non-thermal reaction, the amount of target gas desorbed will essentially be related to the length of time that the current is applied to the adsorbent. In other words, the desorption mechanism does not require that a threshold level of current be applied to the adsorbent 30 above which substantially all of the target gas will be desorbed. This is contrary to a thermal desorption mechanism, wherein the adsorbent must be stochastically heated above a threshold temperature before the target gas will be desorbed. Therefore, the separator 48 allows the target gas to be stored on the adsorbent 30 and metered out as desired through controlled desorption reactions.

Figure 5:
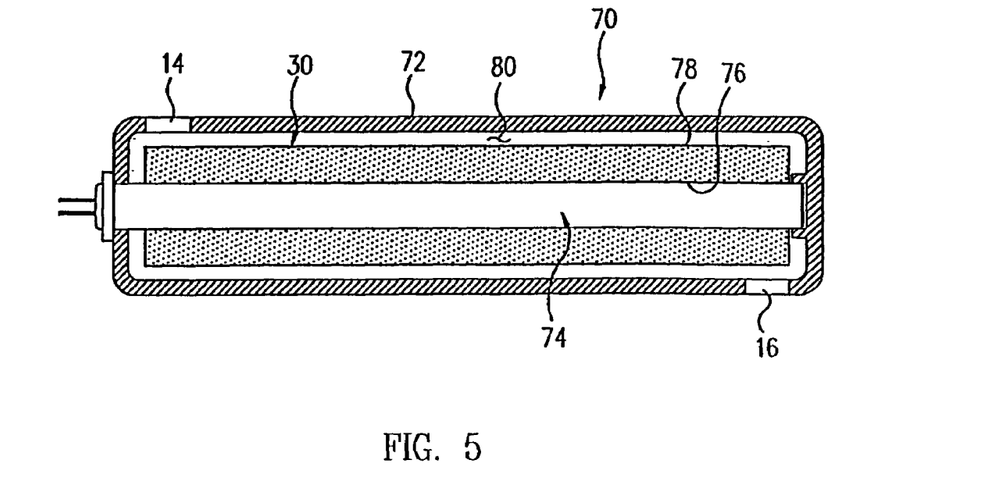
FIG. 5 is another alternative embodiment of the separator component for the apparatus of FIG. 1.

Referring now to FIG. 5, another embodiment of the separator is shown which is particularly useful when heat is employed to desorb the target gas from the adsorbent 30. The separator of this embodiment, which is indicated generally by reference number 70, comprises a generally tubular housing 72 within which the adsorbent 30 is disposed, a heater 74 which is positioned at least partially within the housing adjacent the adsorbent 30, an inlet port 14 and an outlet port 16. The heater 74 could be any apparatus which is used to generate heat, such as an electrical resistance or gas combustion heater. Furthermore, in order to maximize the transfer of heat from the heater 74 to the adsorbent 30, the adsorbent is preferably configured to conform to the heater. Thus, if as shown in FIG. 5 the heater 74 comprises a cylindrical outer diameter, the adsorbent 30 preferably comprises a circular cross section having an inner diameter 76 which is approximately the same as the outer diameter of the heater. Also, in order to facilitate the flow of gas through the separator 70, the adsorbent 30 ideally comprises an outer diameter 78 which is less than the inner diameter of the housing 72 to thereby create an annular area 80 around the adsorbent between the inlet port 14 and the outlet port 16.

In operation of the separator 70, the desorption reaction is initiated by activating the heater 74. When activated, the heater 74 will generate thermal energy in the form of heat, and this heat will be conducted to the adsorbent 30. When the adsorbent 30 is stochastically heated to a degree sufficient to break the bonds between the target gas and the adsorbent molecules, the target gas will begin to desorb from the adsorbent. Continued heating of the adsorbent 30 will ensure that the target gas is completely desorbed from the adsorbent.

It should be recognized that, while the present invention has been described in relation to the preferred embodiments thereof, those skilled in the art may develop a wide variation of structural and operational details without departing from the principles of the invention. For example, the various elements shown in the different embodiments may be combined in a manner not illustrated above. Therefore, the appended claims are to be construed to cover all equivalents falling within the true scope and spirit of the invention.

What is claimed is:

1. An apparatus for separating a first gas from a mixture of the first gas and at least one second gas, the apparatus comprising:

a housing which comprises an inlet port and an outlet port;

an adsorbent which is positioned in the housing;

the adsorbent comprising a carbon based foam monolith that has an affinity for the first gas;

wherein as the gas mixture flows through the housing, the first gas will be adsorbed onto the adsorbent and the second gas will exit the housing through the outlet port;

whereby the first gas is separated from the second gas, wherein the adsorbent comprises a thermal conductivity of at least 100 W/m-K.

2. An apparatus for separating a first gas from a mixture of the first gas and at least one second gas, the apparatus comprising:

a housing which comprises an inlet port and an outlet port;

an adsorbent which is positioned in the housing;

the adsorbent comprising a carbon based foam monolith that has an affinity for the first gas;

wherein as the gas mixture flows through the housing, the first gas will be adsorbed onto the adsorbent and the second gas will exit the housing through the outlet port;

whereby the first gas is separated from the second gas, wherein the carbon based foam monolith comprises a mesophase pitch-based graphite foam product.

3. The apparatus of claim 2, wherein the mesophase pitch-based graphite foam product comprises a mesophase pitch-based activated graphite foam product.

4. The apparatus of claim 1, wherein the adsorbent comprises a number of gas flow passages extending therethrough.

5. The apparatus of claim 4, wherein the passages are aligned with at least one of the inlet and outlet ports.

6. The apparatus of claim 1, wherein the adsorbent comprises at least one cross sectional dimension which is smaller than a corresponding cross sectional dimension of the housing.

7. The apparatus of claim 6, wherein the adsorbent comprises two cross sectional dimensions which are each smaller than the corresponding cross sectional dimensions of the housing.

8. The apparatus of claim 7, wherein the adsorbent comprises means for supporting the adsorbent within the housing.

9. The apparatus of claim 8, wherein the supporting means comprises a number of elongated fins which are each aligned with at least one of the inlet and outlet ports.

10. The apparatus of claim 1, further comprising means for desorbing the first gas from the adsorbent.

11. The apparatus of claim 10, wherein the desorbing means comprises:
   a first electrical conductor which is positioned against a first surface of the adsorbent;
   a second electrical conductor which is positioned against a second surface of the adsorbent; and
   a power supply which is connected across the first and second conductors;
   wherein upon activation of the power supply an electrical current is conducted across the adsorbent to desorb the first gas from the adsorbent in a desorption reaction.

12. The apparatus of claim 11, wherein the desorption reaction is substantially non-thermal.

13. The apparatus of claim 12, wherein the housing comprises the first and second conductors.

14. An apparatus for separating a first gas from a mixture of the first gas and at least one second gas, the apparatus comprising:
   a housing which comprises an inlet port and an outlet port;
   an adsorbent which is positioned in the housing;
   the adsorbent comprising a carbon based foam monolith that has an affinity for the first gas;
   wherein as the gas mixture flows through the housing, the first gas will be adsorbed onto the adsorbent and the second gas will exit the housing through the outlet port;
   whereby the first gas is separated from the second gas;
   means for desorbing the first gas from the adsorbent;
   wherein the desorbing means comprises:
   a first electrical conductor which is positioned against a first surface of the adsorbent;
   a second electrical conductor which is positioned against a second surface of the adsorbent; and
   a power supply which is connected across the first and second conductors;
   wherein upon activation of the power supply an electrical current is conducted across the adsorbent to desorb the first gas from the adsorbent in a desorption reaction, further wherein;
   the housing comprises the first and second conductors; and
   a number of cooling fins attached to at least one of the first and second conductors.

15. The apparatus of claim 10, wherein the desorbing means comprises a heater.

16. The apparatus of claim 15, wherein the heater comprises an electrical resistance heater.

17. The apparatus of claim 15, wherein the heater comprises a cylindrical outer diameter and the adsorbent comprises a generally circular cross section having an inner diameter which is approximately the same as the outer diameter of the heater.

18. The apparatus of claim 15, wherein the housing comprises an annular inner diameter and the adsorbent comprises a generally circular cross section having an outer diameter which is less than the inner diameter of the housing.

19. An apparatus for separating a first gas from a mixture of the first gas and at least one second gas, the apparatus comprising:
   a housing which comprises an inlet port and an outlet port;
   an adsorbent which is positioned in the housing;
   the adsorbent comprising a carbon based foam monolith that has an affinity for the first gas; and
   means for desorbing the first gas from the adsorbent;
   wherein during a first phase of operation of the apparatus the first gas is adsorbed onto the adsorbent to separate the first gas from the second gas, and during a second phase of operation of the apparatus the first gas is desorbed from the adsorbent and expelled through the outlet port
   wherein the desorbing means comprises:
   a first electrical conductor which is positioned against a first surface of the adsorbent;
   a second electrical conductor which is positioned against a second surface of the adsorbent; and
   a power supply which is connected across the first and second conductors;
   wherein upon activation of the power supply an electrical current is conducted across the adsorbent to desorb the first gas from the adsorbent in a desorption reaction;
   further wherein the housing comprises the first and second conductors; and
   a number of cooling fins attached to at least one of the first and second conductors.

20. The apparatus of claim 19, wherein the desorbing means comprises a heater.

21. The apparatus of claim 20, wherein the heater comprises an electrical resistance heater.

22. The apparatus of claim 20, wherein the heater comprises a cylindrical outer diameter and the adsorbent comprises a generally circular cross section having an inner diameter which is approximately the same as the outer diameter of the heater.

23. The apparatus of claim 20, wherein the housing comprises an annular inner diameter and the adsorbent comprises a generally circular cross section having an outer diameter which is less than the inner diameter of the housing.

24. An apparatus for separating a first gas from a mixture of the first gas and at least one second gas, the apparatus comprising:
   a housing which comprises an inlet port and an outlet port;
   an adsorbent which is positioned in the housing; the adsorbent comprising a carbon based foam monolith that
   has an affinity for the first gas; and means for desorbing the first gas from the adsorbent;
wherein during a first phase of operation of the apparatus the first gas is adsorbed onto the adsorbent to separate the first gas from the second gas, and during a second phase of operation of the apparatus the first gas is desorbed from the adsorbent and expelled through the outlet port, wherein the adsorbent comprises a thermal conductivity of at least 100 W/m-K.

25. An apparatus for separating a first gas from a mixture of the first gas and at least one second gas, the apparatus comprising:
a housing which comprises an inlet port and an outlet port;
an adsorbent which is positioned in the housing; the adsorbent comprising a carbon based foam monolith that has an affinity for the first gas; and
means for desorbing the first gas from the adsorbent;
wherein during a first phase of operation of the apparatus the first gas is adsorbed onto the adsorbent to separate the first gas from the second gas, and during a second phase of operation of the apparatus the first gas is desorbed from the adsorbent and expelled through the outlet port, wherein the carbon based foam monolith comprises a mesophase pitch-based graphite foam product.

26. The apparatus of claim 25, wherein the mesophase pitch-based graphite foam product comprises a mesophase pitch-based activated graphite foam product.

27. The apparatus of claim 19, wherein the adsorbent comprises a number of gas flow passages extending therethrough.

28. The apparatus of claim 27, wherein the passages are aligned with at least one of the inlet and outlet ports.

29. The apparatus of claim 19, wherein the adsorbent comprises at least one cross sectional dimension which is smaller than a corresponding cross sectional dimension of the housing.

30. The apparatus of claim 29, wherein the adsorbent comprises two cross sectional dimensions which are each smaller than the corresponding cross sectional dimensions of the housing.

31. The apparatus of claim 30, wherein the adsorbent comprises means for supporting the adsorbent within the housing.

32. The apparatus of claim 31, wherein the supporting means comprises a number of elongated fins which are each aligned with at least one of the inlet and outlet ports.

33. A method for separating a first gas from a mixture of the first gas and at least one second gas, the method comprising:
flowing the gas mixture over or through an adsorbent which has an affinity for the first gas;
adsorbing the first gas onto the adsorbent;
stopping the flow of the gas mixture; and
desorbing the first gas from the adsorbent;
wherein the adsorbent comprises a carbon based foam monolith, further wherein the adsorbent comprises a thermal conductivity of at least 100 W/m-K.

34. The method of claim 33, wherein the carbon based foam monolith comprises a mesophase pitch-based graphite foam product.

35. The apparatus of claim 34, wherein the mesophase pitch-based graphite foam product comprises a mesophase pitch-based activated graphite foam product.

36. The method of claim 33, wherein the desorption step comprises using an electrical current to desorb the first gas from the adsorbent.

37. The method of claim 36, wherein the desorption step is substantially non-thermal.

* * * * *

UNITED STATES PATENT AND TRADEMARK OFFICE
CERTIFICATE OF CORRECTION

| | | |
|---|---|---|
| PATENT NO. | : 7,172,645 B1 | Page 1 of 1 |
| APPLICATION NO. | : 10/611496 | |
| DATED | : February 6, 2007 | |
| INVENTOR(S) | : Dennis M. Pfister and Charles M. Byrd | |

It is certified that error appears in the above-identified patent and that said Letters Patent is hereby corrected as shown below:

Column 9, Line 41, Claim 13, change "claim 12" to --claim 11--.

Signed and Sealed this

First Day of May, 2007

JON W. DUDAS
*Director of the United States Patent and Trademark Office*